United States Patent
Rehm et al.

[11] Patent Number: 5,956,244
[45] Date of Patent: Sep. 21, 1999

[54] CONTROLLING CURRENTS IN PARALLEL AC/DC CONVERTERS

[75] Inventors: Thomas J. Rehm, Mequon; Robert L. Pitsch, Grafton; Timothy J. Martin, Menomonee Falls; Brian R. Buchholz, Pewaukee, all of Wis.

[73] Assignee: Allen-Bradley Company LLC, Milwaukee, Wis.

[21] Appl. No.: 09/035,718

[22] Filed: Mar. 5, 1998

[51] Int. Cl.$^6$ .................................................. H02M 7/48
[52] U.S. Cl. .............................. 363/70; 363/44; 363/84
[58] Field of Search ................................. 363/44, 67, 69, 363/70, 84, 87, 88, 89, 127, 129

[56] References Cited

U.S. PATENT DOCUMENTS

| | | | |
|---|---|---|---|
| 3,970,914 | 7/1976 | Salzmann et al. | 363/70 |
| 4,181,932 | 1/1980 | Fujiwara | 363/84 |
| 5,406,470 | 4/1995 | Ridley et al. | 363/69 |
| 5,460,244 | 10/1995 | Tanahashi | 363/70 |
| 5,796,601 | 8/1998 | Yamamoto | 363/69 |

*Primary Examiner*—Jeffrey Sterett
*Attorney, Agent, or Firm*—Michael A. Jaskolski; John M. Miller; John J. Horn

[57] ABSTRACT

An apparatus for converting three phase AC supply line voltages to DC voltage on a DC bus, the apparatus including a master converter subsystem and at least one slave converter subsystem wherein each subsystem includes a current regulator, a PMW modulator and a converter, the master converter linked to the supply lines and the slave converter linked to the supply lines via intermediate lines, each regulator receiving a current command signal and generating modulating signals, each modulator using a carrier signal and modulating signals from a corresponding regulator to generate control signals to control a corresponding converter, the intermediate lines linked to a common mode choke for essentially eliminating common mode currents in the intermediate lines.

9 Claims, 2 Drawing Sheets

CONTROLLING CURRENTS IN PARALLEL AC/DC CONVERTERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to voltage converters generally and more specifically to parallel arranged AC-to-DC regenerative converters.

Power is typically provided to factories, homes and the like via a utility grid including utility lines. Utility lines are usually bundled into line sets, each set including three utility lines, the lines together providing three phase AC utility voltages at relatively high utility amplitudes and low frequencies. In most cases, utility voltage amplitudes and frequencies are not suitable for driving electrical equipment and machinery and the amplitudes and frequencies must be modified prior to being used.

The most common way to modify utility voltage characteristics is to use an AC-to-DC rectifier for converting the three phase utility voltages to a DC voltage across positive and negative rails of a DC bus. A DC bus capacitor is provided across the rails which charges as current is provided to the rails. A DC-to-AC inverter is used to convert the DC voltage to three phase AC voltages on three feed lines which are linked to electrical equipment and machinery. The inverter can be regulated to control both frequency and amplitude of the resulting AC voltages on the feed lines. Machinery linked to the feed lines draws current from the DC bus.

In addition to drawing current from the DC bus, some machinery can operate in a reverse mode to provide current back through the feed lines to the DC bus. For example, while a motor draws current from the DC bus during motoring, the motor can operate as a generator during a braking process to provide current back to the DC bus. In essence, the inverter acts as a rectifier during braking tending, like the rectifier connected to the utility grid, to charge the bus capacitor.

When current is returned to the DC bus the total bus current can reach a level which will destroy the bus capacitor if the current on the bus is not reduced. One way to reduce bus current is to provide a switch in series with a braking resistor in parallel with the bus capacitor. If capacitor charge exceeds a threshold level, the switch is closed so that the braking resistor dissipates braking energy. Unfortunately, this way to reduce bus current is inefficient as the resistor effectively wastes energy returned to the DC bus.

A more efficient way to reduce bus current is to use a controllable regenerative, or switch-mode, rectifier. As the name implies, a regenerative rectifier can be controlled such that it operates in a regenerative or reverse mode to provide excessive bus current back to the utility lines. To this end, a regenerative rectifier includes at least six switches arranged to form three parallel legs between the positive and negative DC buses, each leg including two series connected switches. Switches linked to the positive DC bus will be referred to herein as upper switches and switches linked to the negative DC bus will be referred to herein as lower switches. Six separate diodes are arranged in inverse parallel relationship with the switches, a separate diode connected to each switch. Each of the three utility lines is connected to a rectifier input node between an associated pair of series switches via an input reactor (e.g. an inductor). Thus, the voltage difference between a supply line voltage and a rectifier input node voltage is impressed across a reactor therebetween.

In operation, to provide current to the DC bus, rectifier switches are alternately turned on and off such that a series of high frequency voltage pulses are generated at an associated rectifier input nodes. The RMS value of the resulting high frequency voltage pulses results in a low frequency alternating voltage at the input node. By controlling the high frequency pulses, the desired low frequency alternating voltage can be regulated. During motoring the switches are controlled to generate input voltages at the input nodes which lag the utility voltages and have a slightly smaller amplitude. Where the rectifier input voltages are slightly less than corresponding utility voltages, currents pass through the input reactors from the utility lines to the rectifier thereby providing currents to charge the bus capacitor.

To reduce DC bus voltage and return current to the utility lines, rectifier switches are controlled to generate rectifier input voltages which lead the utility voltages and have a slightly greater amplitude. Where the rectifier voltages are slightly greater than corresponding utility voltages, currents pass through the input reactors from the rectifier to the utility lines thereby sinking current from the DC bus and "regenerating" the current back to the utility lines.

To regulate a regenerative rectifier a controller is provided. The controller receives a DC bus voltage command signal and uses the voltage command signal to generate control signals to turn rectifier switches on and off in a sequence which will generate desired low frequency alternating voltages at the rectifier inputs. To this end, a controller typically includes, among other things, a voltage regulator, a current regulator, several voltage and current sensors, a carrier signal generator and a pulse width modulating (PWM) modulator. A voltage sensor is linked to the DC bus to sense the DC bus voltage and provide a DC feedback signal to the voltage regulator. The voltage regulator also receives a DC voltage command signal and compares the DC feedback and command signals to generate a current command signal.

A current sensor is linked to the utility supply lines and provides line current feedback signals to the current regulator. The current regulator also receives the current command signal and cooperates with several other controller components to compare the current feedback and current command signals to generate three modulating signals, one modulating signal for each of the three parallel rectifier legs. The carrier generator generates a triangle carrier signal having a frequency which is much higher than the modulating signal frequency.

The modulator receives and compares each modulating signal to the carrier signal. When a modulating signal is greater than the carrier signal, the modulator turns on a corresponding upper switch and turns off a corresponding lower switch. Similarly, when a modulating signal is less than the carrier signal, the modulator turns off a corresponding upper switch and turns on a corresponding lower switch. When an upper switch is on a corresponding utility line is linked to the positive DC bus and when a lower switch is on a corresponding utility line is linked to the negative DC bus. Thus, the modulator generates high frequency voltage pulses at the rectifier inputs, the average values of which can be regulated by changing the modulating signals.

The modulator generates modulating signals which have waveforms calculated to draw line currents $i_a$, $i_b$ and $i_c$ from the utility lines such that:

$$i_a + i_b + i_c = 0 \qquad \text{Eq. 1}$$

The amount of current which can be passed by a rectifier switch is limited to a maximum level above which additional current will destroy the switch. For this reason, the maximum current which a rectifier can pass to the DC bus and a corresponding maximum DC bus voltage are also limited. Unfortunately, many industrial machines require much higher currents than a single rectifier can provide.

To increase the maximum current which can be provided via a DC bus, two or more regenerative rectifiers and corresponding controllers can be configured in a parallel relationship wherein each rectifier is linked between the three utility supply lines and a common DC bus. Bus capacitor size is increased to accommodate higher bus current levels. Each rectifier is capable of drawing current from the utility lines and providing the current to the DC bus, the combined rectifier currents capable of charging the bus capacitor to a voltage level and supply current which is approximately linearly related to the number of parallel rectifiers. For example, two rectifiers can supply current which is approximately twice as high as the current achievable using a single rectifier.

While parallel configured rectifier/controller systems can increase maximum bus current levels, they can adversely effect rectifier operation. An example of how a parallel configured rectifier/controller system can adversely effect rectifier operation is instructive. Assume that the parallel system includes only first and second rectifiers and associated controllers, each rectifier linking the utility lines to the DC bus. Rectifier and controller components corresponding to each of the utility lines operate in an identical fashion and therefore, to simplify this explanation, operation will only be described with respect to components corresponding to a first of the three lines. The first supply line is linked to a first rectifier input node (on the first rectifier) between a series connected upper/lower switch pair via a first reactor and is linked to a second rectifier input node (on the second rectifier) via a second reactor.

During operation, ideally, each of the upper switches is turned on and turned off at the same time and each of the lower switches is turned on and turned off at the same time. Where ideal operation occurs, identical voltages are generated across the first and second reactors and therefore each draws an identical amount of current from the first supply line.

In reality, however, while modulating signals for each of the first and second controller modulators and carrier signals provided by each controller carrier generator might be similar, they are almost never identical so that switches in the first and second rectifiers are almost never in sink. Where the first upper switch is on and the second upper switch in off, the DC bus voltage is impressed across the first and second inductors and causes a current spike through the first and second inductors. These current spikes often rise to several times the rectifier current ratings, prevent normal rectifier operation and can, over time, damage or even destroy rectifier components.

One solution to minimize current spikes due to asymmetrical switching sequences is to synchronize carrier signals and synchronize modulating signals for each parallel converter system. To this end, some in the industry have provided a single carrier signal generator which provides an identical carrier signal to each controller modulator. In addition, these solutions typically provide an identical current command signal to each controller current regulator so that modulating signals for each modulator are essentially identical.

While identical carrier signals and identical modulating signals reduce current spikes, independent rectifier current control and both software timing and hardware offset differences amongst the rectifiers and controllers render it almost impossible to generate symmetrical switching sequences. Thus, even where carrier signals are identical and modulating signals are identical, at least some current spikes still occur and adversely effect rectifier operation.

For this reason, it would be advantageous to have an apparatus which could eliminate current spikes through input reactors caused by asymmetrical switching sequences in parallel configured AC-to-DC regenerative converters.

BRIEF SUMMARY OF THE INVENTION

As well known in the controls art, a current regulator generates modulating signals such that resulting currents $i_a$, $i_b$ and $i_c$ drawn through, or provided to, the three reactors linked to a corresponding rectifier sum to zero (see Equation 1). It has been recognized that when asymmetrical switching of switches in parallel configured converters causes a current spike, the current spike is a common mode current which causes the sum of currents $i_a$, $i_b$ and $i_c$ to be other than zero. According to the present invention, where a first converter system is a master system and a second converter system is a slave system, a common mode choke (CMC) is provided between reactors linking a slave rectifier and the utility supply lines. The CMC provides an extremely large impedance to common mode current but virtually no impedance to currents drawn or provided by the slave rectifier. The high impedance effectively blocks common mode currents thereby protecting rectifier switches.

One object of the invention is to eliminate current spikes through input reactors caused by asymmetrical switching sequences. A CMC includes a flux guiding core which typically forms a toroid or a "C" shaped member having several legs (e.g. iron). First, second and third intermediate lines which connect a slave rectifier to the utility supply lines and carry currents $i_a$, $i_b$ and $i_c$, respectively, form coils around CMC legs. Each coil is wrapped in the same direction and all coils have identical numbers of turns.

As well known in the industry, when a current passes through a coil around a core, the current generates a flux within the core which effectively impedes current flow up to a point of core saturation. Thus, when the combined current through all three intermediate lines have a non-zero value, the combined current, a common mode current, generates a core flux which impedes current flow. Thus, a CMC impedes and effectively blocks unintended current spikes through reactors connected thereto.

Another object of the invention is to eliminate current spikes without effecting rectifier drawn, or provided, currents. When currents $i_a$, $i_b$ and $i_c$ pass through respective coils, while each current $i_a$, $i_b$ and $i_c$ separately would generate a flux in the core, because currents $i_a$, $i_b$ and $i_c$ add to zero, together currents $i_a$, $i_b$ and $i_c$ generate no flux in the core. In essence, currents $i_a$, $i_b$ and $i_c$ pass through the intermediate lines unimpeded.

One other object of the invention is to achieve the aforementioned objects inexpensively. A CMC is relatively easy to manufacture and install and is, therefore, inexpensive to configure. In addition, CMCs typically have robust designs requiring minimal maintenance.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

In the description which follows, an "e" subscript denotes a signal which is referred to the synchronous frame of reference, an "s" subscript denotes a signal which is referred to the stationary frame of reference, an "*" superscript denotes a command signal and an "f" subscript denotes a feedback signal. Throughout the drawings and in the description which follows like reference numbers and characters are used to identify like system components, signals and waveforms.

A. Hardware

Figure 1:
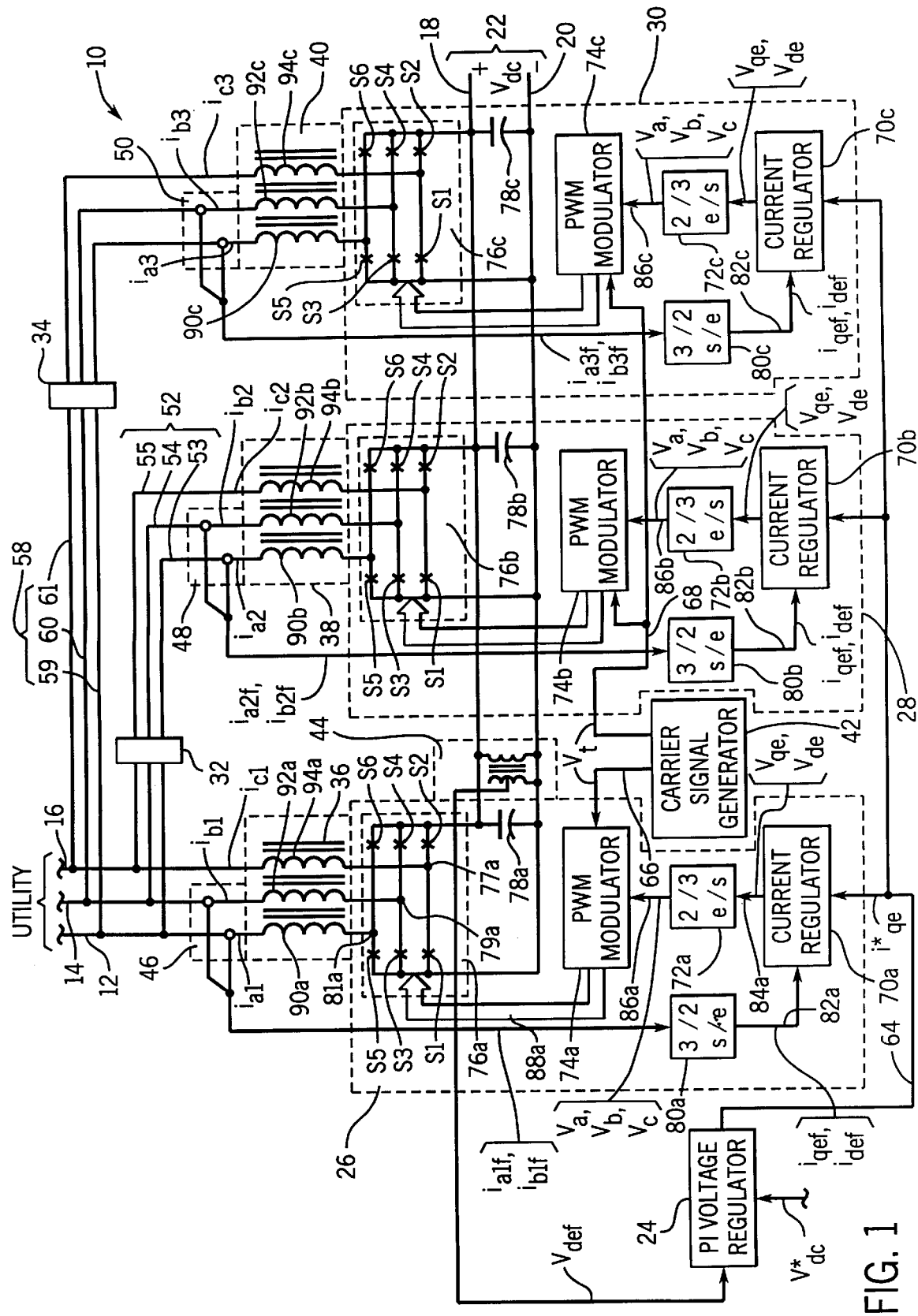
FIG. 1 is a schematic diagram of a rectifier/controller system according to the present invention.

Referring now to FIG. 1, a rectifier/controller system 10 according to the present invention is illustrated. System 10 receives three phase AC utility supply voltages on three utility supply lines 12, 14 and 16 and also receives a DC voltage command signal $V_{dc}^*$ and converts the AC supply voltages to a DC voltage $V_{dc}$ across positive and negative DC rails 18, 20 respectively, which together form a DC bus 22. System 10 generates DC voltage $V_{dc}$ which is equal to command voltage signal $V_{dc}^*$. To this end, among other things, system 10 includes a voltage regulator 24, a master converter subsystem 26, a first slave converter subsystem 28, a second slave converter subsystem 30, a first common mode choke (CMC) 32, a second CMC 34, a master reactor set 36, a first slave reactor set 38, a second slave reactor set 40, a carrier signal generator 42, a voltage sensor 44 and first, second and third current sensing assemblies 46, 48, 50, respectively.

Voltage sensor 44 is linked to bus 22 and senses bus voltage $V_{dc}$ providing a DC voltage feedback signal $V_{dcf}$. Reactor set 36 includes three reactors 90a, 92a and 94a. Reactor 90a links subsystem 26 to line 12, reactor 92a links subsystem 26 to line 14 and reactor 94a links subsystem 26 to line 16. Set 38 includes reactors 90b, 92b and 94b which link sub-assembly 28 to first, second and third intermediate lines 53, 54 and 55, respectively, lines 53, 54 and 55 in turn linking reactors 90b, 92b and 94b to supply lines 12, 14 and 16. Similarly, set 40 includes reactors 90c, 92c and 94c which link sub-assembly 30 to intermediate lines 59, 60 and 61, respectively, lines 59, 60 and 61 in turn linking reactors 90c, 92c and 94c to supply lines 12, 14 and 16, respectively. Capacitors 78a, 78b and 78c are provided across DC rails 18 and 20 to both smooth and store DC bus voltage $V_{dc}$.

First current sensing assembly 46 includes two current sensors (e.g. Hall effect sensors), a separate sensor linked to each of supply lines 12 and 14 such that assembly 46 provides current feedback signals $i_{a1f}$ and $i_{b1f}$ indicative of currents $i_{a1}$ and $i_{b1}$ passing through lines 12 and 14.

Similarly, second current sensing assembly 48 includes two current sensors, a separate sensor linked to each of intermediate lines 53 and 54 to provide current feedback signals $i_{a2f}$ and $i_{b2f}$ indicative of currents $i_{a12}$, $i_{b2}$ passing through intermediate lines 53 and 54. In addition, third current sensing assembly 50 includes two current sensors linked to intermediate lines 59 and 60 for sensing currents $i_{a3}$ and $i_{b3}$ in lines 59 and 60 and providing current feedback signals $i_{a3f}$ and $i_{b3f}$.

Voltage regulator 24 receives DC voltage command signal $V_{dc}^*$ and DC voltage feedback signal $V_{dcf}$ and compares those signals to generate a q-axis synchronous command current signal $i_{qe}^*$ on a line 64. Preferably, regulator 24 is a proportional-integral (PI) voltage regulator. Current command signal $i_{qe}^*$ is provided to each of subsystems 26, 28 and 30.

Carrier signal generator 42 generates a high frequency triangle carrier signal $V_t$ which is provided to subsystem 26 via a line 66 and is provided to subsystems 28 and 30 via a line 68. Thus, in accordance with the present invention, identical current command signals $i_{qe}^*$ and identical carrier signals $V_t$ are provided to each subsystem 26, 28 and 30.

Subsystems 26, 28 and 30 each have essentially identical configurations and each operates in an essentially identical manner and therefore, in order to simplify this explanation, only subsystem 26 will be explained here in detail, operation of subsystems 28 and 30 only explained to the extent that their operation in conjunction with subsystem 26 is synergistically important. In order to clearly indicate similar components among subsystems 26, 28 and 30, similar components in each subsystem are identified by an identical number followed by a subsystem unique letter. For example, each of subsystems 26, 28 and 30 includes a current regulator. The current regulator in subsystem 26 is referred to by numeral 70a, whereas the current regulators in subsystems 28 and 30 is referred to by reference numerals 70b and 70c, respectively.

Referring still to FIG. 1, subsystem 26 includes a current regulator 70a, a forward transformer 72a, a PWM modulator 74a, a master rectifier 76a, a DC bus capacitor 78a, a feedback transformer 80a and a plurality of lines and data buses. Feedback transformer 80 receives current feedback signals $i_{a1f}$ and $i_{b1f}$ and identifies line current $i_{c1}$ passing through line 16 by solving the following equation:

$$i_{c1} = -(i_{a1f} + i_{b1f}) \qquad \text{Eq. 2}$$

After current $i_{c1}$ has been determined, transformer 80a performs a three-to-two phased transformation on signals $i_{a1f}$, $i_{b1f}$ and $i_{c1}$ generating stationary d and q-axis current feedback signals $i_{dsf}$ and $i_{qsf}$ (not illustrated). A circuit such as that described in "Control Methods for Good Dynamic Performance Induction Motor Drives Based on Current and Voltage as Measured Quantities", by Robert Joetten and Gerhard Maeder and published in IEEE-IAS Transactions, IA-19, No. 3, May/June 1983, may be employed for this purpose. After stationary d and q-axis feedback current signals $i_{dsf}$ and $i_{qsf}$ have been generated, transformer 80a performs a stationary-to-synchronous transformation thereby generating synchronous d and q-axis current feedback signals $i_{def}$ and $i_{qef}$ which are provided on line 82a. Stationary-to-synchronous transformations are well known in the controls art and therefore will not be explained here in detail.

Current regulator 70a receives both current command signal $i_{qe}^*$ and current feedback signals $i_{qef}$ and $i_{def}$, internally generates a d-axis synchronous current command signal $i_{de}^*$ (not illustrated) and compares current feedback signals $i_{qef}$ and $i_{def}$ to current command signals $i_{qe}*$ and $i_{de}*$ to generate synchronous d and q-axis voltage signals $V_{de}$ and $V_{qe}$ on line 84a. Current regulator 70a provides voltage signals $V_{qe}$ and $V_{de}$ which are calculated to eliminate any difference between feedback current signals $i_{qef}$ and $i_{def}$ and command current signals $i_{qe}*$ and $i_{de}*$. One current regulator which might be employed as regulator 70a is described in U.S. Pat. No. 4,680,645 entitled "Cross Coupled Current Regulator" which issued on Jul. 14, 1987 and which is incorporated herein by reference.

Forward transformer 72a effectively reverses the transformations which were performed by feedback transformer 80a. To this end, transformer 72a first receives synchronous d and q-axis voltage signals $V_{de}$ and $V_{qe}$ and performs a synchronous-to-stationary transformation generating stationary d and q-axis voltage signals $V_{ds}$ and $V_{qs}$, respectively (not illustrated). Then, transformer 72a performs a two-to-three phase transformation on the stationary d and q-axis voltage signals $V_{ds}$ and $V_{qs}$ to generate three modulating wave forms or signals $V_a$, and $V_b$ and $V_c$ on a data bus 86a, a separate modulating signal $V_a$, $V_{b1}$ and $V_c$ for each of lines 12, 14 and 16, respectively. A circuit such as that described in "Control and Simulation of a Current Fed Linear Inductor Machine" by B. K. Bose and Thomas Lipo published in IEEE-IAS Conference Record, pp. 876–883, 1978, may be employed for this purpose.

Rectifier 76a includes six switch assemblies S1, S2, S3, S4, S5 and S6 which are arranged in pairs to form three parallel rectifier legs between positive and negative DC rails 18 and 20, respectively. Each switch assembly S1 through S6 includes a solid state switch (e.g. BJT, GTO, etc.) and a diode connected in inverse parallel relationship thereacross. For the purpose of simplifying this explanation, each assembly S1 through S6 will be referred to hereinafter simply as a switch S1 through S6, respectively. A first leg includes series configured switches S2 and S1, switch S2 being an upper switch linked to positive DC rail 18 and switch S1 being a lower switch linked to negative DC rail 20. Similarly, a second leg includes series configured upper and lower switches S4 and S3, respectively and a third leg includes series configured upper and lower switches S6 and S5, respectively. A rectifier input node 77a between switches S1 and S2 is linked to reactor 94a, a rectifier input node 79a between switches S3 and S4 is linked to reactor 92a and a rectifier input node 81a between switches S5 and S6 is linked to reactor 94a. Thus, pair S1 and S2 is linked to line 16, pair S3 and S4 is linked to line 14 and pair S5 and S6 is linked to line 12. Each switch S1 through S6 is linked via a data bus 88a to modulator 74a receiving control signals therethrough for turning the switch on and off.

Each of rectifiers 76b and 76c also includes six switches S1 through S6 which are similarly linked to associated reactor sets 38 and 40. Thus, in each of rectifiers 76b and 76c switch pairs S1 and S2 are linked to line 16, pairs S3 and S4 are linked to line 14 and pairs S5 and S6 are linked to line 12.

Referring again to subsystem 26, modulator 74a receives modulating signals $V_a$, $V_b$ and $V_c$ and carrier signal $V_t$ and compares each modulating signal $V_a$, $V_b$ and $V_c$ to carrier signal $V_t$ to generate control signals for turning switches S1 through S6 (in rectifier 76a) on and off. To generate control signals for switches S5 and S6, modulator 74a compares modulating signal $V_a$ and carrier signal $V_t$. Similarly, to generate control signals for switches S3 and S4, modulator 74a compares modulating signal $V_b$ and carrier signal $V_t$. In addition, to generate control signals for switches S1 and S2, modulator 74b compares modulating signal $V_c$ and carrier signal $V_t$. Because modulator 74a performs the same procedure to compare each of modulating signals $V_a$, $V_b$ and $V_c$ to carrier signal $V_t$, in order to simplify this example, only comparison of signal $V_c$ to carrier signal $V_t$ and resulting control of switches S1 and S2 will be explained here.

When comparing modulating signal $V_c$ and carrier signal $V_t$, when modulating signal $V_c$ is greater than carrier signal $V_t$, modulator 74a generates control signals which turn on switch S2 and turn off switch S1 such that positive DC rail 18 is connected through reactor 94a to line 16. This generates a positive high frequency voltage pulse at rectifier input node 77a. When modulating signal $V_c$ is less than carrier signal $V_t$, modulator 74a generates control signals on line 88a to turn off switch S2 and turn on switch S1 so that negative DC rail 20 is connected through reactor 94a to line 16 thereby generating a negative high frequency voltage pulse at rectifier input node 77a. The RMS value of high frequency voltage pulses generated at input node 77a results in a low frequency alternating voltage at node 77a. By modifying the widths of the generated positive and negative high frequency voltage pulses, modulator 74a can modify the voltage (i.e. the difference between the utility supply line voltage on line 16 and the generated voltage at rectifier input node 77a) across reactor 94a thereby controlling current $i_{c1}$ passing through reactor 94a.

Figure 2:
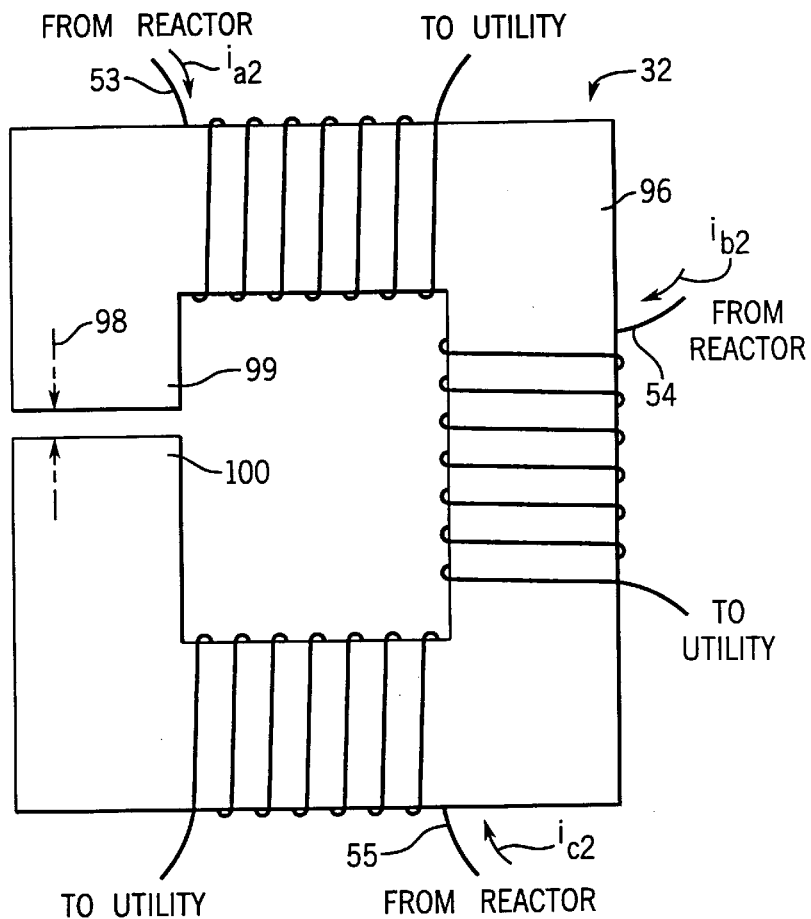
FIG. 2 is a plan view of one of the common mode of chokes of FIG. 1.

Each of common mode chokes 32 and 34 preferably has an identical configuration and therefore, only choke 32 is explained here. Referring to FIGS. 1 and 2, choke 32 comprises a "C" shaped metal core 96 which forms a gap 98 between adjacent core ends 99 and 100. Each of intermediate lines 53, 54 and 55 is wrapped around core 96 an identical number of times and in the same direction. While only a few coils are illustrated, in preferred embodiments lines 53, 54 and 55 each form several hundred turns about core 96.

B. Operation

In operation, regulator 24, signal generator 42 and subassemblies 26, 28 and 30 cooperate to minimize undesirable volt-seconds applied to reactor sets 36, 38 and 40. To this end, identical synchronous q-axis current command signals $i_{qe}*$ are supplied to each current regulator 70a, 70b and 70c. Regulators 70a, 70b and 70c use current command signal $i_{qe}*$ to ultimately modify corresponding modulating signals $V_a$, $V_b$ and $V_c$ which are provided to modulators 74a, 74b and 74c. In addition, each of modulators 74a, 74b and 74c receives an identical carrier signal from generator 42.

Despite receiving identical current command signals $i_{qe}*$ and identical carrier signals $V_t$, because each subsystem 26, 28 and 30 includes an independent current control, because each of rectifiers 76a, 76b and 76c provides slightly different operation (i.e. some switches might turn on and/or off slightly more quickly than others) and because software timing for each of subsystems 26, 28 and 30 might be slightly different, some volt-second asymmetry will still occur across reactor sets 36, 38 and 40. Asymmetrical volt-seconds across sets 36, 38 and 40 generate common mode currents in intermediate lines 53, 54 and 55 and in intermediate lines 59, 60 and 61 and in reactor set 36.

Referring to reactor set 38 in FIG. 1 and also to FIG. 2, each of currents $i_{a2}$, $i_{b2}$ and $i_{c2}$ passes through its corresponding intermediate line 53, 54 or 55. Because each of lines 53, 54 and 55 forms a coil around core 96, each of currents $i_{a2}$, $i_{b2}$ and $i_{c2}$ would separately generate a flux in core 96. Because modulator 74b always draws currents $i_{a2}$, $i_{b2}$ and $i_{c2}$ or provides current $i_{a2}$, $i_{b2}$ and $i_{c2}$ which collectively add to a zero current value, the flux generated by currents $i_{a2}$, $i_{b2}$ and $i_{c2}$ within core 96 cancel and the combined currents effectively generate no flux in core 96 such that each of currents $i_{a2}$, $i_{b2}$ and $i_{c2}$ effectively experience zero impedance from core 96.

However, common mode currents within lines 53, 54 and 55 generate flux within core 96 which does not cancel. Therefore, flux within core 96 due to common mode currents causes high impedance to common mode currents and effectively impedes those currents. Gap 98 is provided to reset core flux.

Because currents $i_{a2}$, $i_{b2}$ and $i_{c2}$ generate flux within core 96 which effectively cancel each other, choke heating is minimized.

It should be recognized that a simple and relatively inexpensive apparatus has been described for eliminating asymmetrical volt-seconds applied across line reactors of parallel arranged AC-to-DC regenerative voltage converter assemblies. By combining both a software modification wherein current command signals to current regulators are identical and carrier signals to PWM modulators are identical and hardware including a common mode choke between utility lines and reactor sets associated with slave converter subsystems, asymmetry across line reactors can be substantially reduced.

Figure 3:
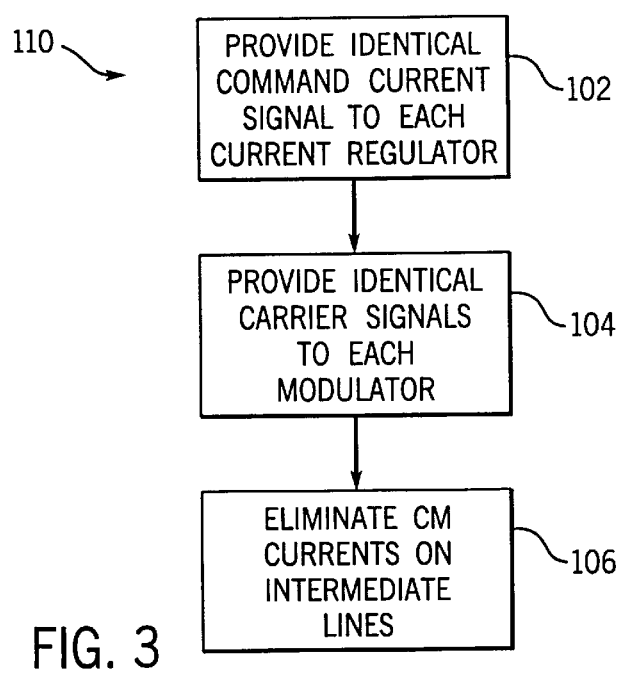
FIG. 3 is a flow chart illustrating an inventive method.

While an apparatus has been described above, the present invention also contemplates a method which can be used to eliminate asymmetrical volt-seconds across AC line reactors. To this end, referring to FIG. 3, the flow chart of a preferred method according to the present invention is illustrated. Referring also to FIG. 1, the preferred method is for converting AC voltage on supply lines 12, 14 and 16 to DC voltage between DC rails 18 and 20. According to the method 110, during system operation, at step 102 identical current command signals $i_{qe}^*$ are provided to each current regulator 70a, 70b and 70c. Then, at step 104, identical carrier signals $V_t$ are provided to each of modulators 74a, 74b and 74c. With input signals $i_{qe}^*$ and $V_t$, subassemblies 26, 28 and 30 draw currents through lines 12, 14, 16, 53, 54, 55, 59, 60 and 61. At step 106, common mode currents on intermediate lines 53, 54, 55, 59, 60 and 61 are eliminated.

C. Other Embodiments

It should be understood that the methods and apparatuses described above are only exemplary and do not limit the scope of the invention, and that various modifications could be made by those skilled in the art that would fall under the scope of the invention. For example, while the invention is described above as including one master converter subsystem 26 and first and second slave converter subsystems 28, 30, respectively, clearly the invention is applicable to systems including only a single slave converter subsystem or any number of slave converter subsystems (e.g. 5, 6, etc.). In addition, while relatively simple subsystems 26, 28 and 30 have been described, clearly other more complex subsystems which include other control processes could be employed. Moreover, while "C" shaped core 96 is illustrated, other choke core configurations (e.g. toroidal, figure "8", etc.) could be employed.

To apprise the public of the scope of this invention, we make the following claims:

We claim:

1. An apparatus for converting AC voltage on first, second and third supply lines to DC voltage between positive and negative DC buses, the apparatus comprising:

a voltage regulator providing a current command signal;

a carrier generator for generating a carrier signal;

a master converter subsystem including a master current regulator, a master PWM modulator and a master converter, the master converter including six switches arranged to form master first, second and third series switch pairs between the positive and negative DC buses, a first input node between the first master pair linked to the first supply line, a second input node between the second master pair linked to the second supply line and a third input node between the third master pair linked to the third supply line, the master regulator using the current command signal to generate master modulating signals, the master PWM modulator using the master modulating signals and the carrier signal to generate control signals for controlling the master converter switches;

a slave converter subsystem including a slave current regulator, a slave PWM modulator and a slave converter, the slave converter including six switches arranged to form slave first, second and third series switch pairs between the positive and negative DC buses, a fourth input node between the first slave pair linked to the first supply line via a first intermediate line, a fifth input node between the second slave pair linked to the second supply line via a second intermediate line and a sixth input node between the third slave pair linked to the third supply line via a third intermediate line, the slave regulator using the current command signal to generate slave modulating signals, the slave PWM modulator using the slave modulating signals and the carrier signal to generate control signals for controlling the slave converter switches; and a common mode choke linked to the first, second and third intermediate lines to essentially eliminate common mode currents in the first, second and third intermediate lines.

2. The apparatus of claim 1 wherein a second common mode choke is linked between the first, second, and third supply lines and the master converter to essentially eliminate common mode currents in the first, second, and third supply lines.

3. The apparatus of claim 1 wherein the slave converter subsystem is a first slave subsystem, the common mode choke is a first common mode choke and the apparatus further includes N additional slave subsystems and N additional common mode chokes where N is at least one, each additional slave subsystem including an additional slave current regulator, an additional slave PWM modulator and an additional slave converter, each additional slave converter including six switches arranged to form additional slave first, second and third series switch pairs between the positive and negative DC buses, a seventh input node between each additional first slave pair linked to the first supply line via an additional first intermediate line, an eighth input node between the additional second slave pair linked to the second supply line via an additional second intermediate line and a ninth input node between the additional third slave pair linked to the third supply line via an additional third intermediate line, each additional slave regulator using the current command signal to generate additional slave modulating signals, each additional slave PWM modulator using corresponding additional slave modulating signals and the carrier signal to generate control signals for controlling corresponding additional slave converter switches, each additional common mode choke linked to corresponding additional first, second and third intermediate lines to essentially eliminate common mode currents in the corresponding additional first, second and third intermediate lines.

4. The apparatus of claim 3 wherein N is one.

5. The apparatus of claim 1 further including a bus voltage sensor for sensing DC voltage across the positive and negative DC buses and providing a DC voltage feedback signal, the voltage regulator receiving the DC voltage feedback signal and a DC voltage command signal and comparing the received signals to provide the current command signal.

6. The apparatus of claim 5 further including at least first and second master current sensors linked to the first and second supply lines for providing master current feedback signals to the master regulator and further including at least first and second slave current sensors linked to the first and second intermediate lines for providing slave current feedback signals to the slave regulator.

7. The apparatus of claim 1 further including at least one capacitor across the positive and negative DC buses.

8. A method for converting AC voltage on first, second and third supply lines to DC voltage between positive and negative DC rails, the method for use with an apparatus including a master converter subsystem and at least one slave converter subsystem wherein each subsystem includes a current regulator, a PWM modulator and a converter, each regulator using a current command signal to generate modulating signals for controlling an associated modulator, each modulator using a carrier signal and corresponding modulating signals to generate control signals for controlling a corresponding converter, the master converter linked to each of the supply lines and the slave converter linked to the first, second and third supply lines via first, second and third intermediate lines, respectively, the method comprising the steps of:

providing the same current command signal to each of the master and slave current regulators;

providing the same carrier signal to each of the master and slave modulators; and essentially eliminating common mode currents on the first, second and third intermediate lines.

9. The method of claim 8 further including the steps of sensing the DC voltage across the positive and negative DC buses to provide a DC voltage feedback signal, receiving a DC voltage command signal and comparing the DC feedback and command signals to generate the current command signal.

* * * * *